(12) United States Patent
Tsukiji

(10) Patent No.: US 11,800,227 B2
(45) Date of Patent: Oct. 24, 2023

(54) CONTROL METHOD, CONTROL DEVICE, IMAGE-CAPTURING APPARATUS, AND COMPUTER READABLE RECORDING MEDIUM

(71) Applicant: Asahi Kasei Microdevices Corporation, Tokyo (JP)

(72) Inventor: Hidekazu Tsukiji, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 17/959,280

(22) Filed: Oct. 3, 2022

(65) Prior Publication Data

US 2023/0156332 A1    May 18, 2023

(30) Foreign Application Priority Data

Nov. 12, 2021  (JP) .................................. 2021-184604

(51) Int. Cl.
| | | |
|---|---|---|
| *H04N 23/68* | (2023.01) | |
| *H04N 23/695* | (2023.01) | |
| *H02K 41/035* | (2006.01) | |

(52) U.S. Cl.
CPC ....... *H04N 23/687* (2023.01); *H04N 23/6812* (2023.01); *H04N 23/695* (2023.01); *H02K 41/0354* (2013.01)

(58) Field of Classification Search
CPC ............. H04N 23/695; H04N 23/6812; H04N 23/687; H04N 23/685; H02K 41/0358; H02K 41/0354; H02K 41/0356; G02B 27/646; G02B 7/023; G02B 7/08;
(Continued)

(56) References Cited

U.S. PATENT DOCUMENTS

| | | | | |
|---|---|---|---|---|
| 8,004,570 B2* | 8/2011 | Saito | ................... | H04N 23/6815 |
| | | | | 348/208.99 |
| 8,588,597 B2* | 11/2013 | Miyahara | ........... | H04N 23/6812 |
| | | | | 359/557 |
| 9,225,901 B2* | 12/2015 | Shibata | ................ | H04N 23/687 |

(Continued)

FOREIGN PATENT DOCUMENTS

| | | |
|---|---|---|
| JP | 2015227945 A | 12/2015 |
| JP | 2017184600 A | 10/2017 |

(Continued)

*Primary Examiner* — Pritham D Prabhakher

(57) ABSTRACT

A program may cause a computer to perform the steps of: acquiring a target posture information indicating a target posture of a movable member with m degrees of freedom components associated with a movement or rotation of the movable member; deriving a correction information indicating a corrective component for correcting an error in respective target positions of m+n positions of the movable member due to at least one of n degrees of freedom components other than m degrees of freedom, based on at least one value of m+n values corresponding to m+n positions of the movable member indicated in respective position informations; deriving respective target positions of each of m+n positions of the movable member based on m degrees of freedom components and the corrective component; and outputting respective target position informations indicating the respective target positions to each of m+n control circuits.

19 Claims, 15 Drawing Sheets

(58) Field of Classification Search
CPC ...... G02B 7/04; G03B 5/00; G03B 2217/005;
G03B 2205/0015; H02P 25/034
USPC ...................................................... 348/208.2
See application file for complete search history.

(56) References Cited

U.S. PATENT DOCUMENTS

| | | | | |
|---|---|---|---|---|
| 9,338,355 B2 * | 5/2016 | Watanabe | ............ | H04N 23/682 |
| 9,560,247 B2 * | 1/2017 | Topliss | ................ | H04N 23/687 |
| 9,678,493 B2 * | 6/2017 | Ishikawa | ................ | H02P 25/06 |
| 10,313,593 B2 * | 6/2019 | Miyahara | ............ | H04N 23/687 |
| 10,895,756 B2 * | 1/2021 | Awazu | ................... | H04N 23/00 |
| 2007/0297781 A1 * | 12/2007 | Kitano | .................... | G03B 5/06 |
| | | | | 396/55 |
| 2009/0231452 A1 * | 9/2009 | Noguchi | ............ | H04N 23/6812 |
| | | | | 348/208.11 |
| 2011/0157380 A1 * | 6/2011 | Yamazaki | ............. | H04N 23/68 |
| | | | | 348/208.4 |
| 2012/0013752 A1 * | 1/2012 | Matsuoka | ............. | H04N 23/60 |
| | | | | 348/208.4 |
| 2012/0014681 A1 | 1/2012 | Miyahara | | |
| 2012/0044369 A1 * | 2/2012 | Irisawa | ............. | H04N 23/6812 |
| | | | | 359/554 |
| 2012/0163784 A1 * | 6/2012 | Saito | .................... | H04N 23/687 |
| | | | | 396/55 |
| 2015/0198783 A1 | 7/2015 | Shimotsu | | |
| 2015/0350507 A1 | 12/2015 | Topliss | | |
| 2020/0326557 A1 * | 10/2020 | Awazu | .................. | G02B 7/102 |

FOREIGN PATENT DOCUMENTS

| | | | |
|---|---|---|---|
| JP | | 2019028340 A | 2/2019 |
| JP | | 2019045699 A | 3/2019 |

* cited by examiner

CONTROL METHOD, CONTROL DEVICE, IMAGE-CAPTURING APPARATUS, AND COMPUTER READABLE RECORDING MEDIUM

BACKGROUND

1. Technical Field

The contents of the following Japanese patent application(s) are incorporated herein by reference:
NO. 2021-184604 filed in JP on Nov. 12, 2021

The present invention relates to a control method, a control device, an image-capturing apparatus, and a computer readable recording medium.

2. Related Art

Patent document 1 discloses that a closed loop driving signal to be adopted to an optical camera shake correction actuator is used to improve an evaluation on a position of a moving body, and a measurement value from a position sensor is adjusted such that a crosstalk between axes of optical camera shake correction is compensated.

PRIOR ART DOCUMENT

Patent Document

Patent document 1: U.S. Pat. No. 9,560,247

DESCRIPTION OF EXEMPLARY EMBODIMENTS

Hereinafter, the present invention will be described through embodiments of the invention, but the following embodiments do not limit the invention according to the claims. In addition, not all of the combinations of features described in the embodiments are essential to the solving means of the invention.

Figure 1:
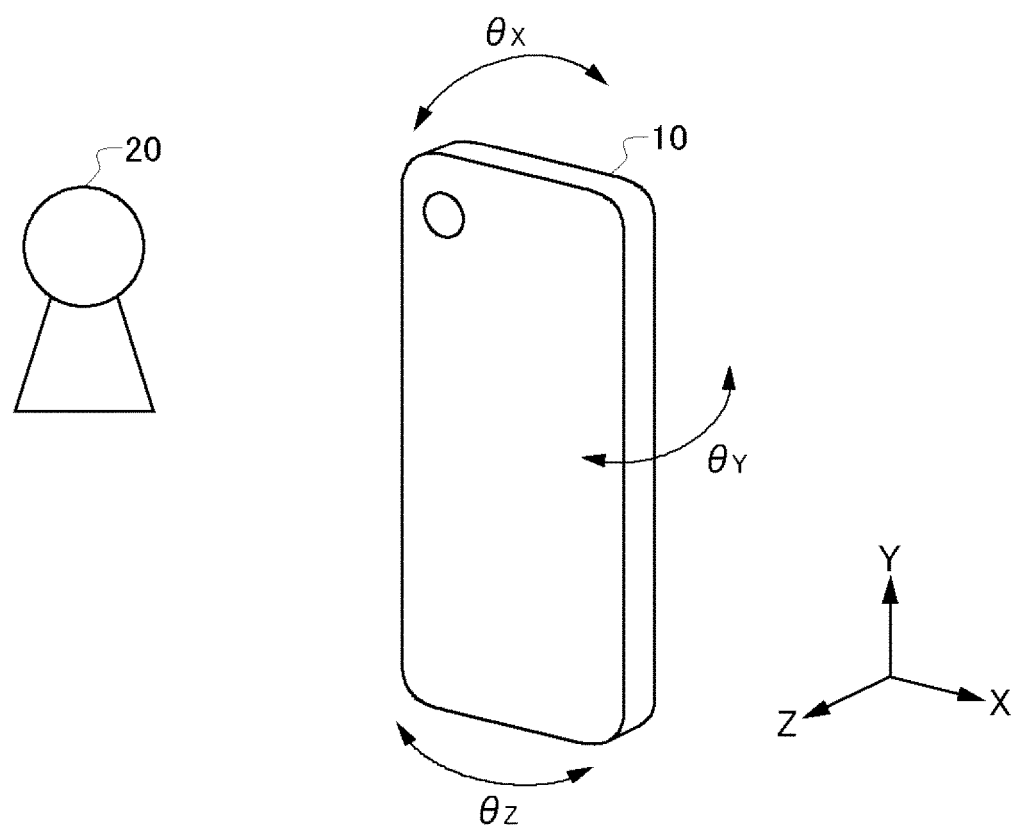
FIG. 1 shows an example of an image-capturing apparatus according to the present embodiment.

FIG. 1 shows an example of an image-capturing apparatus 10 according to the present embodiment. A mobile terminal such as a mobile phone, a tablet, a laptop computer, or a small computer may function as the image-capturing apparatus 10.

The image-capturing apparatus 10 captures an image of an object 20. At this time, if a user holding the image-capturing apparatus 10 moves or rotates a position of the image-capturing apparatus 10, an irregularity due to an image shake would be generated in the captured picture image. For example, during the image-capturing, the user may move or rotate the image-capturing apparatus 10 in a direction such as an X direction, a Y direction, a Z direction, an angle $\theta_X$, an angle $\theta_Y$, or an angle $\theta_Z$. The angle $\theta_X$, the angle $\theta_Y$, and the angle $\theta_Z$ represent a rotation angle around an X axis, a rotation angle around a Y axis, and a rotation angle around a Z axis, respectively. Therefore, the image-capturing apparatus 10 has a function of detecting a moving direction and a rotation direction of itself, and moving or rotating an optical system such as a lens or an image-capturing element to a direction opposite to the detected moving direction to correct an image shake.

Figure 2:
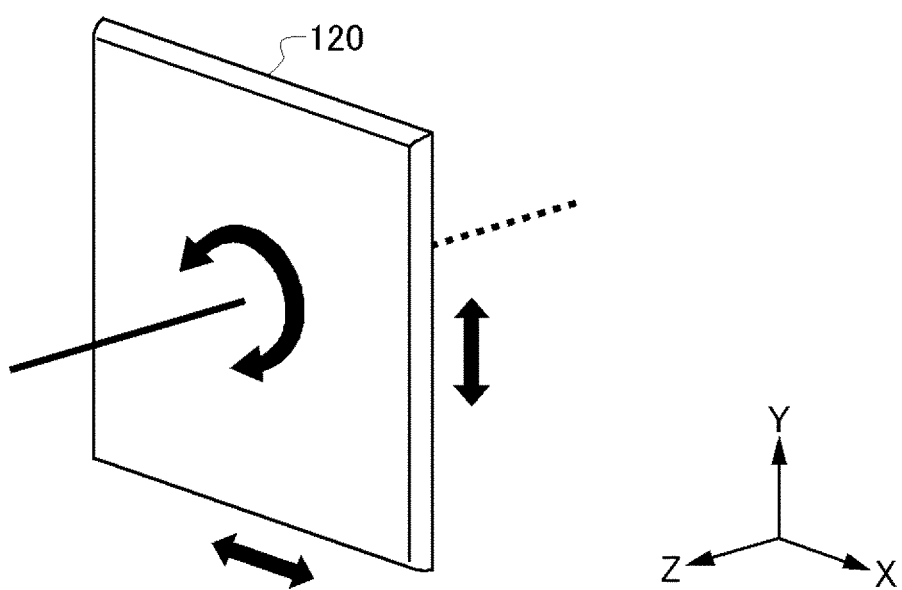
FIG. 2 shows a behavior of a movement and a rotation of an image-capturing element.

FIG. 2 shows a behavior of a movement and a rotation of an image-capturing element 120. The image-capturing element 120 is movable in an XY plane, and is rotatable on an axis along the Z axis intersecting with the XY plane. The image-capturing apparatus 10 corrects an image shake by moving the image-capturing element 120 in the XY plane or rotating the image-capturing element 120 on the axis along the Z axis, in a direction opposite to the detected moving direction and rotation direction of itself.

Figure 3:
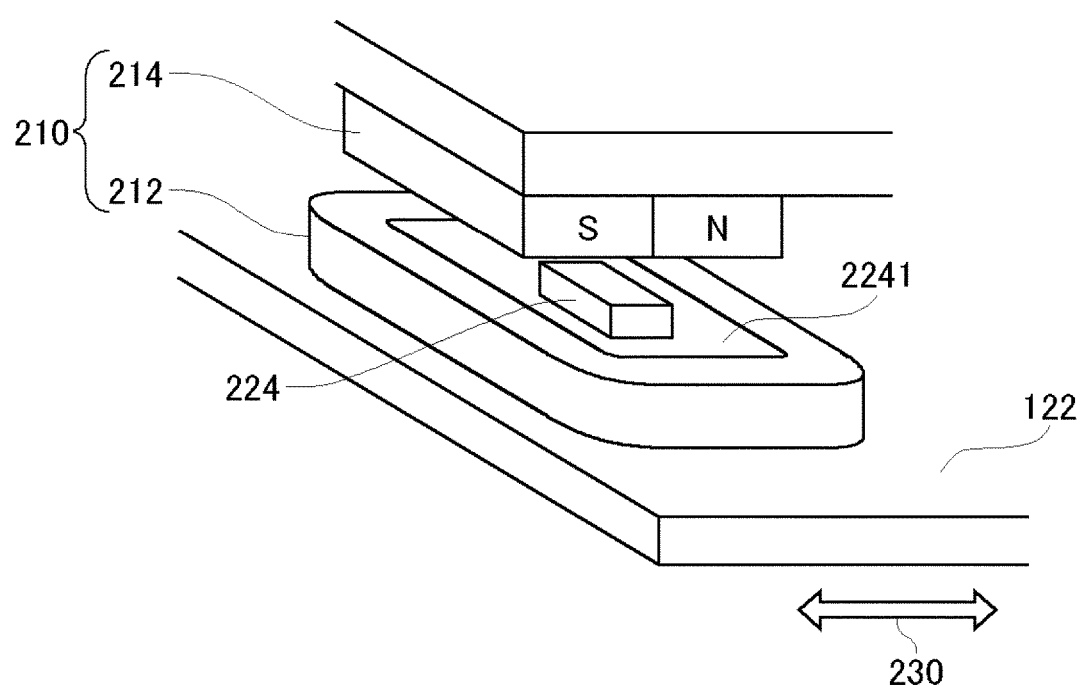
FIG. 3 shows a behavior of driving of an electromagnetic actuator.

An electromagnetic actuator, i.e., a voice coil motor can be utilized as an actuator that becomes a driving source to drive the image-capturing element 120. FIG. 3 shows a behavior of driving of an electromagnetic actuator 210. The electromagnetic actuator 210 includes an air-core coil 212 and a magnet 214. A substrate 122 is an example of a movable member, and the image-capturing element 120 is arranged above the substrate 122. That is, the image-capturing element 120 is movable together with the substrate 122.

If current is supplied to the air-core coil 212 in a magnetic field of the magnet 214, a force is generated in the air-core coil 212 in a direction perpendicular to the field. In this manner, a thrust along an arrow direction 230 is given to the substrate 122. A position sensor 224 is arranged in an air-core portion 2241 of the air-core coil 212 above the substrate 122. The position sensor 224 may be a magnetic sensor such as a Hall element. The position sensor 224 may output a voltage of a magnitude according to a variation of the magnetic field. By a movement of the substrate 122, a positional relation between the position sensor 224 and the magnet 214 is varied, and a magnitude of the magnetic field detected with the position sensor 224 is varied. In this manner, the position sensor 224 detects a position of the position sensor 224, i.e., a position of the substrate 122, with respect to the magnet 214. It should be noted that the present embodiment describes an embodiment in which the air-core coil 212 is arranged above the substrate 122. However, the magnet 214 may be arranged above the substrate 122.

Figure 4:
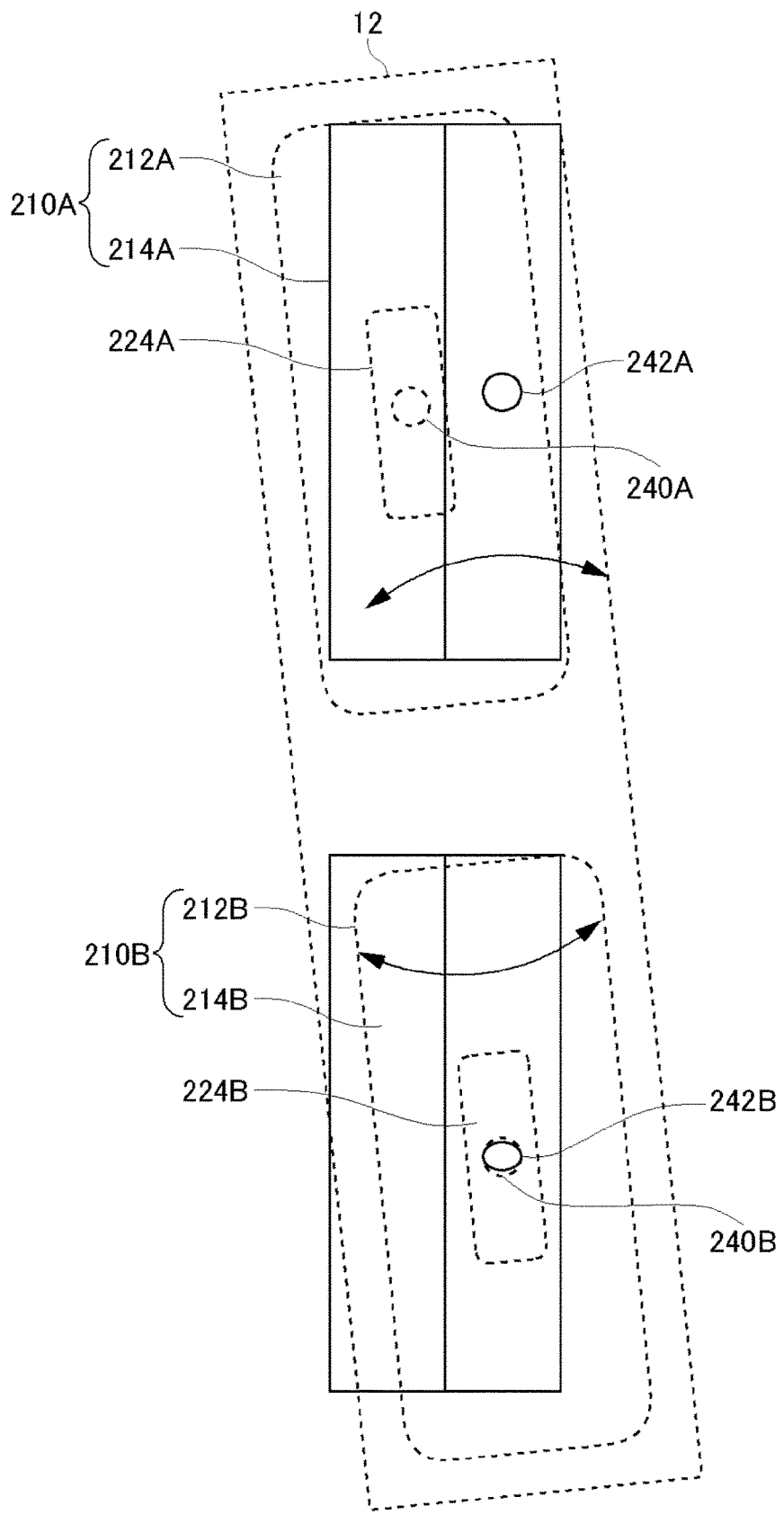
FIG. 4 shows a behavior when driving a movable member with two electromagnetic actuators.

FIG. 4 shows a behavior when driving a movable member 12 such as the substrate 122 with two electromagnetic actuators 210A, 210B. When driving the movable member 12 with the electromagnetic actuators 210A, 210B, in a state where a position 240B of a position sensor 224B moved by driving of one electromagnetic actuator 210B reaches a target position 242B in relation to a magnet 214B, a position 240A of a position sensor 224A moved by driving of the other electromagnetic actuator 210A may not reach a target position 242A in relation to a magnet 214A. In such case, current further flows in an air-core coil 212A of the other electromagnetic actuator 210A such that the position 240A of the position sensor 224A reaches the target position 242A in relation to the magnet 214A. In this manner, once the position 240A of the position sensor 224A reaches the target position 242A in relation to the magnet 214A, the position 240B of the position sensor 224B is displaced with respect to the target position 242B in relation to the magnet 214B. By repeating this, current continually flows in the air-core coil 212A and the air-core coil 212B, and electrical power consumed in the electromagnetic actuators 210A, 210B may increase.

In addition, the position 240A of the position sensor 224A may not reach the target position 242A in relation to the magnet 214A, and the position 240B of the position sensor 224B may not reach the target position 242B in relation to the magnet 214B. In such case, in a state where the movable member 12 maintains a present posture, current continually flows in the air-core coil 212A of the electromagnetic actuator 210A such that the position 240A of the position sensor 224A reaches the target position 242A in relation to the magnet 214A, and current also continually flows in the air-core coil 212B of the electromagnetic actuator 210B such that the position 240B of the position sensor 224B reaches the target position 242B in relation to the magnet 214B. In this manner, electrical power consumed in the electromagnetic actuators 210A, 210B may increase.

These phenomena occur because a solution to a simultaneous equation for a sensed position of the movable member 12 and a target position cannot be derived as shown below, due to a position displacement between a position of the movable member 12 sensed with the position sensor 224A and the position sensor 224B and an actual position of the movable member 12 caused by a manufacturing error of the position sensor 224A and the position sensor 224B, an influence of a magnetic field existing in the surroundings other than the magnetic fields of the magnet 214A and the magnet 214B, or the like. An increase in an electrical power consumption from the failure to derive the solution of the simultaneous equation may be caused when the electromagnetic actuators 210A, 210B are independently controlled. That is, it may be caused when a detection result of the position sensor 224A is used for a feedback control of the electromagnetic actuator 210A and not used for a feedback control of the electromagnetic actuator 210B, whereas a detection result of the position sensor 224B is used for the feedback control of the electromagnetic actuator 210B and not used for the feedback control such as a PID control of the electromagnetic actuator 210A.

Such phenomena can be prevented if each target position of the movable member 12 for reaching a target posture of the movable member 12 matches each position detected with each position sensor 224, respectively. That is, such phenomena can be prevented if each target position of the movable member 12 for reaching the target posture of the movable member 12 can be accurately derived in consideration of a position displacement in each position sensor 224.

Figure 5:
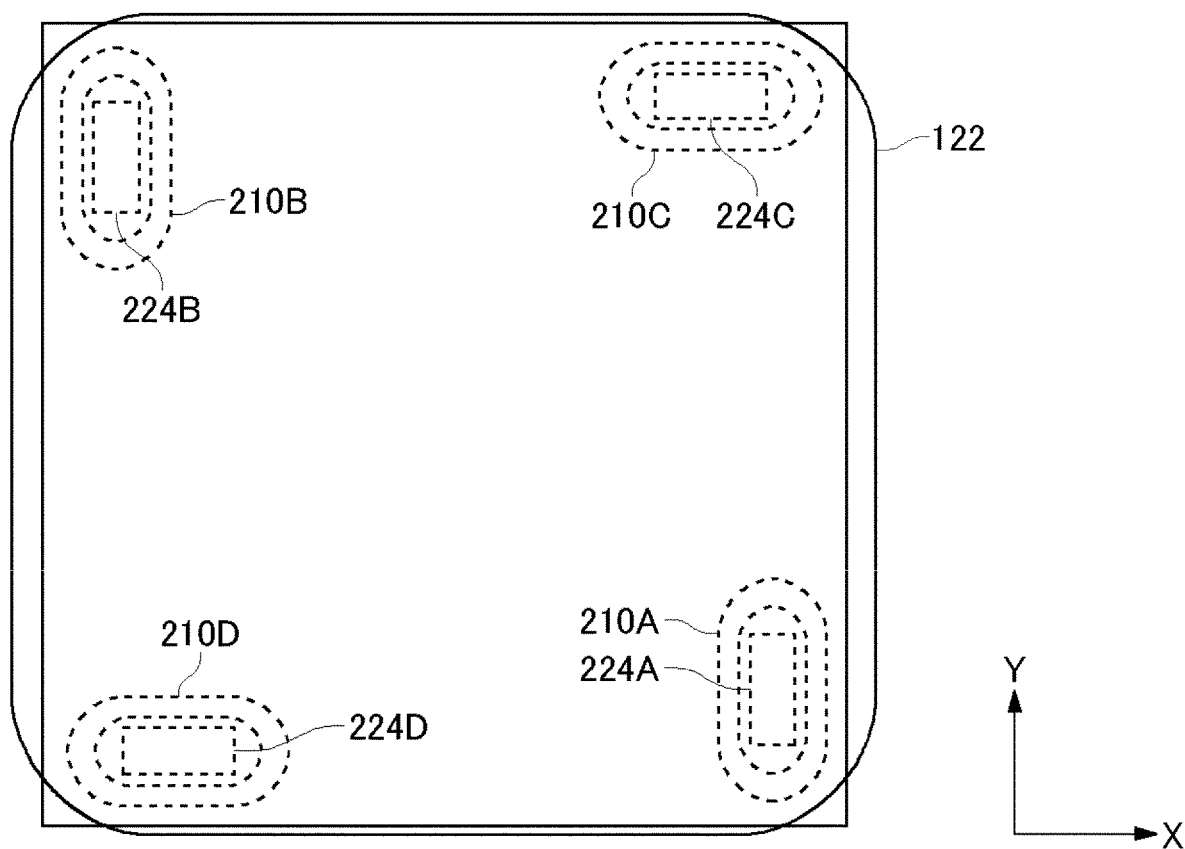
FIG. 5 shows a state in which four electromagnetic actuators and four position sensors are arranged above a substrate.

FIG. 5 shows a state in which four electromagnetic actuators 210A, 210B, 210C, 210D (hereinafter, may be collectively referred to as the electromagnetic actuators 210) and four position sensors 224A, 224B, 224C, 224D (hereinafter, may be collectively referred to as the position sensors 224) are arranged above the substrate 122. Receiving thrusts from the four electromagnetic actuators 210, with three degrees of freedom, the substrate 122 moves in an X direction and a Y direction and rotates on a rotational axis along the Z axis perpendicular to the XY plane.

Figure 6A:
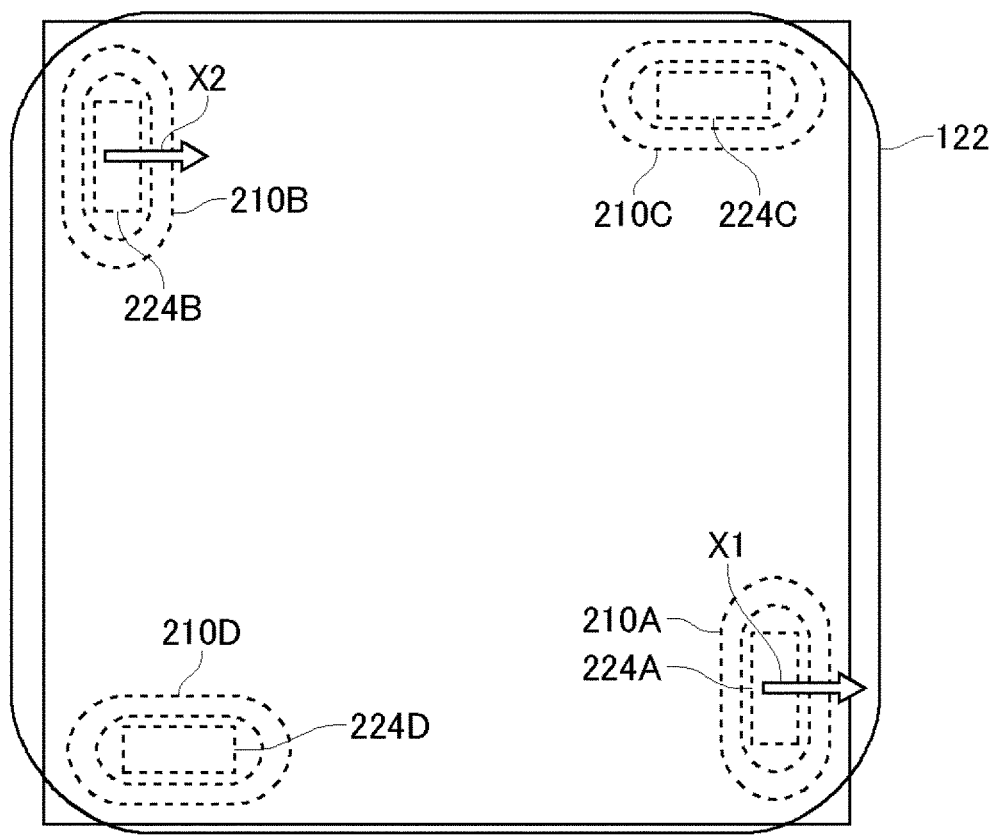
FIG. 6A illustrates that the electromagnetic actuator gives a thrust of a component in an X direction to the substrate.
Figure 6B:
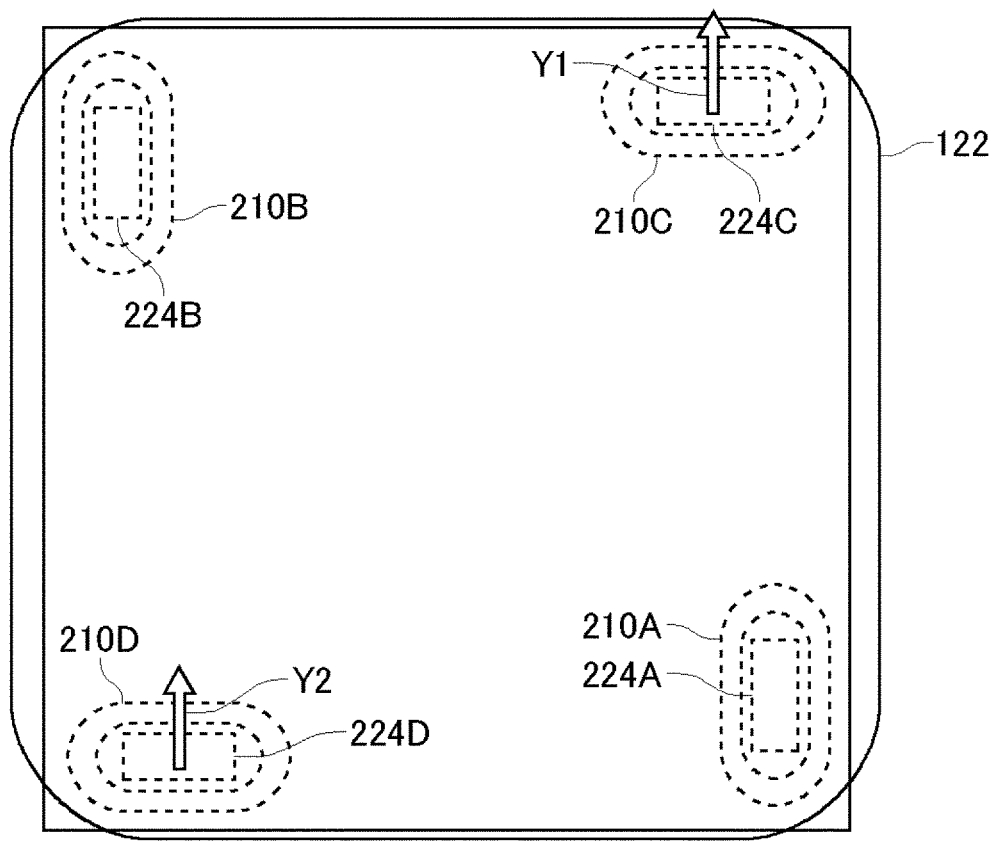
FIG. 6B illustrates that the electromagnetic actuator gives a thrust of a component in a Y direction to the substrate.
Figure 6C:
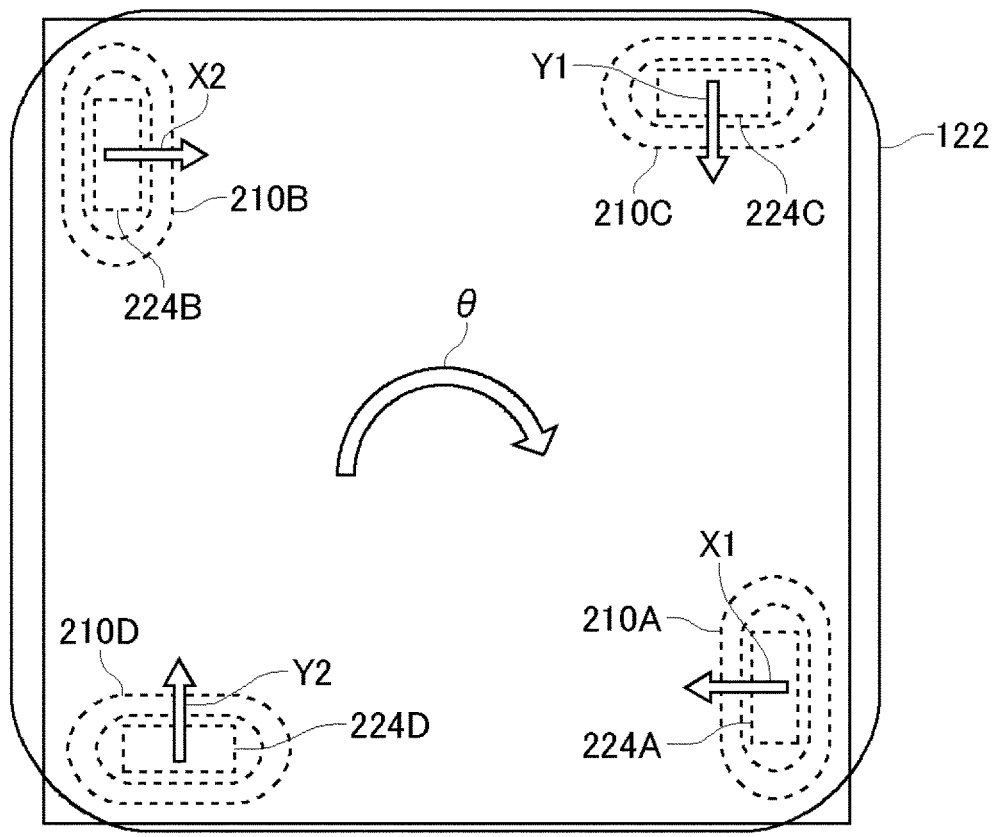
FIG. 6C illustrates that the electromagnetic actuator gives a thrust of a component of a rotation to the substrate.
Figure 6D:
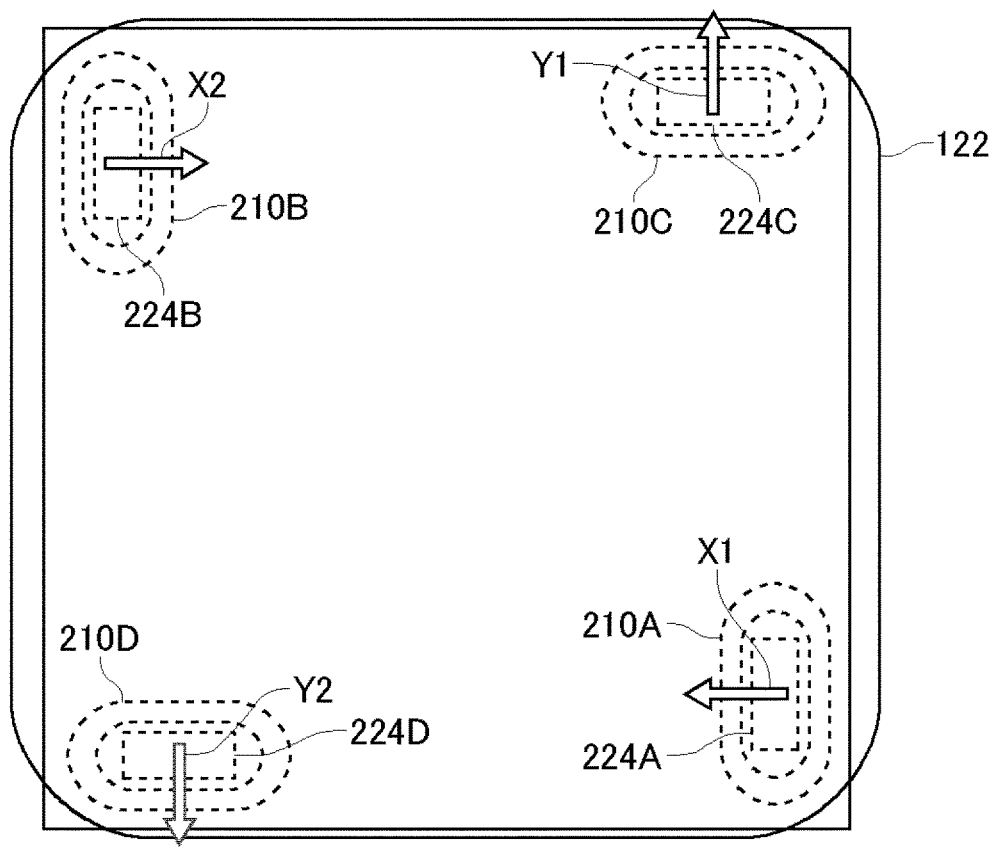
FIG. 6D illustrates a component of an excess degree of freedom given by the electromagnetic actuator to the substrate.

As shown in FIG. 6A, the electromagnetic actuator 210A and the electromagnetic actuator 210B give the substrate 122 thrusts of a component X1 and a component X2 in the X direction in a coordinate system of the substrate 122. As shown in FIG. 6B, the electromagnetic actuator 210C and the electromagnetic actuator 210D give the substrate 122 thrusts of a component Y1 and a component Y2 in the Y direction in the XY coordinate system of the substrate 122. In addition, as shown in FIG. 6C, the electromagnetic actuators 210A, 210B, 210C, 210D give the substrate 122 a thrust of a rotational component θ by a synthesis of respective thrust component X1, component X2, component Y1, component Y2. Furthermore, as shown in FIG. 6D, if an error is included in a position detected with the position sensors 224, an excess degree of freedom component R which does not contribute to a movement and a rotation of the substrate 122 and originally should not exist, exists in addition to the degrees of freedom X component and Y component and the rotational component θ which contribute to the movement and the rotation of the substrate 122.

A position of the electromagnetic actuator 210A in a coordinate system A detected with the position sensor 224A is denoted by x1. A position of the electromagnetic actuator 210B in a coordinate system B detected with the position sensor 224B is denoted by x2. A position of the electromagnetic actuator 210C in a coordinate system C detected with the position sensor 224C is denoted by y1. A position of the electromagnetic actuator 210D in a coordinate system D detected with the position sensor 224D is denoted by y2. In addition, each target position that should be detected with each position sensor 224 corresponding to a target posture (X, Y, θ) is denoted by $x1_T$, $x2_T$, $y1_T$, $y2_T$.

A relationship between the target posture (X, Y, θ) and the target positions ($x1_T$, $x2_T$, $y1_T$, $y2_T$) can be mathematically expressed by the following formula (1).

$$\begin{pmatrix} X \\ Y \\ \theta \end{pmatrix} = \frac{1}{2} \begin{pmatrix} 1 & 1 & 0 & 0 \\ 0 & 0 & 1 & 1 \\ -1 & 1 & -1 & 1 \end{pmatrix} \begin{pmatrix} x1_T \\ x2_T \\ y1_T \\ y2_T \end{pmatrix} \quad (1)$$

To derive the target positions ($x1_T$, $x2_T$, $y1_T$, $y2_T$) satisfying the target posture (X, Y, θ), it is necessary to derive a solution of the simultaneous equation satisfying four variables ($X1_T$, $x2_T$, $y1_T$, $y2_T$) in relation to three variables (X, Y, θ). However, as described above, a position detected with the position sensors 224 has a possibility of including an error. Therefore, the solution of the simultaneous equation satisfying four variables (x1, x2, y1, y2) in relation to three variables (X, Y, θ) may not be derived. In such case where the solution cannot be derived, the posture of the substrate 122 cannot be made to a target posture, and there is a possibility of an increase in electrical power consumed in each electromagnetic actuator 210.

Therefore, in consideration of the excess degree of freedom component R, the solution of the simultaneous equation satisfying the target positions ($x1_T$, $x2_T$, $y1_T$, $y^2_T$) which are four variables will be derived as shown in the following formula (2) in relation to four variables (X, Y, θ, R).

$$\begin{pmatrix} x1_T \\ x2_T \\ y1_T \\ y2_T \end{pmatrix} = \begin{pmatrix} 1 & 0 & -1 & -1 \\ 1 & 0 & +1 & +1 \\ 0 & 1 & -1 & +1 \\ 0 & 1 & +1 & -1 \end{pmatrix} \begin{pmatrix} X \\ Y \\ \theta \\ R \end{pmatrix} \quad (2)$$

With the numerical formula having the above-described matrix, each solution for $X1_T$, $x2_T$, $y1_T$, $y2_T$ can be derived even when an error is included in a position detected with the position sensors 224.

The excess degree of freedom component R may be derived from the following formula (3) having each reference point of the substrate 122 detected with the position sensors 224, for example, positions x1, x2, y1, y2 which are positions in the substrate 122 where each position sensor 224 is arranged, as variables.

$$\begin{pmatrix} X \\ Y \\ \theta \\ R \end{pmatrix} = \frac{1}{2} \begin{pmatrix} 1 & 1 & 0 & 0 \\ 0 & 0 & 1 & 1 \\ -1 & 1 & -1 & 1 \\ -1 & 1 & 1 & -1 \end{pmatrix} \begin{pmatrix} x1 \\ x2 \\ y1 \\ y2 \end{pmatrix} \quad (3)$$

That is, the excess degree of freedom component R may be derived based on a value corresponding to the position of each reference point detected with each position sensor 224 and the numerical formula having the above-described 4×4 matrix. It should be noted that each component of the numerical formula having the 4×4 matrix of the formula (3) is an example, and each component may be adjusted according to a magnetic characteristic of each position sensor 224, the position detected with the position sensors 224, the target position, and the like. In addition, after deriving the R using the formula (3), a feedback control is performed to move each position of each reference point to each target position according to the formula (2). At the time of this feedback control, the target position may be adjusted by performing an arithmetic processing of magnifying by a scale of the R.

Figure 7:
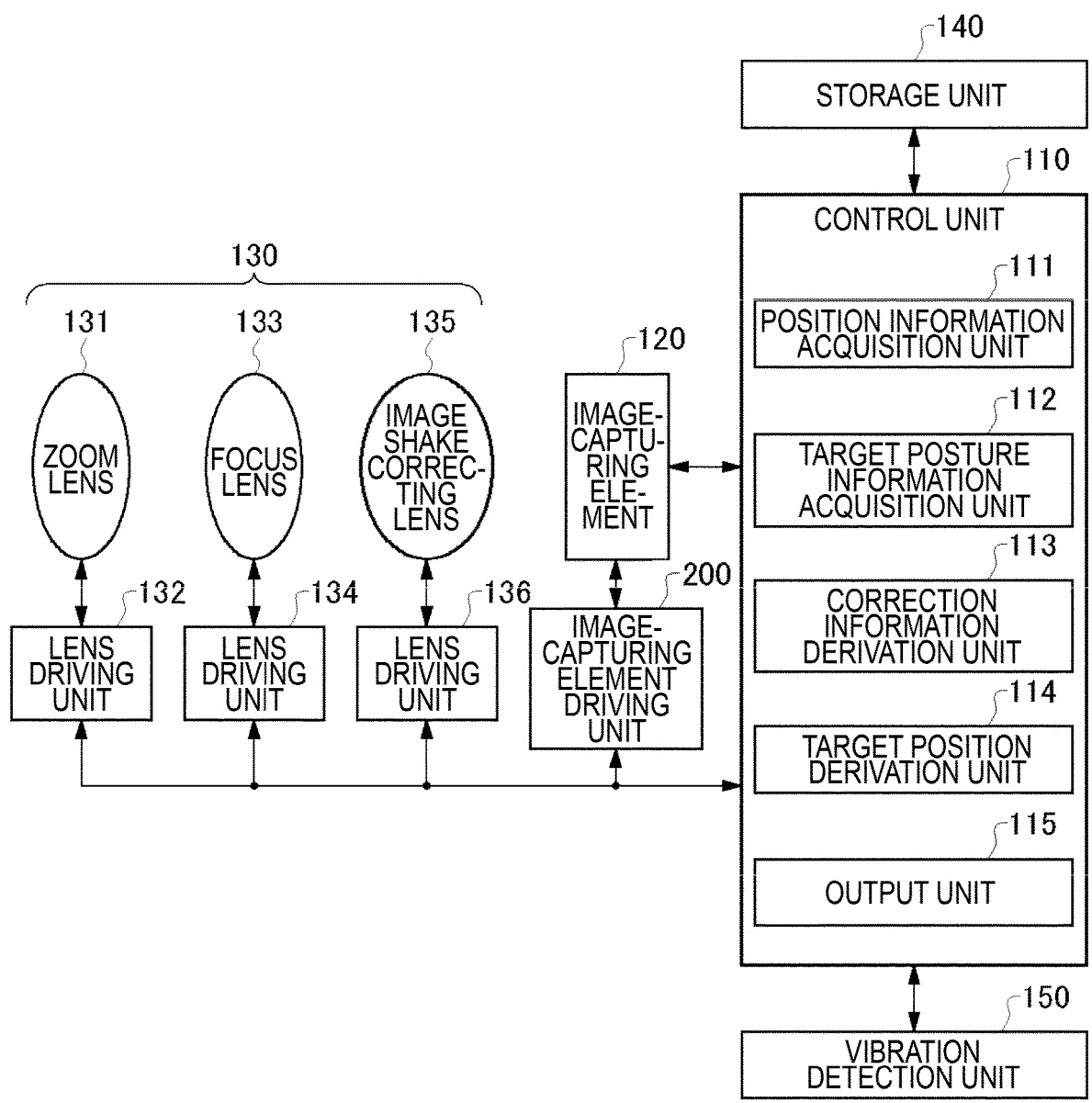
FIG. 7 shows an example of functional blocks of the image-capturing apparatus.

FIG. 7 shows an example of functional blocks of the image-capturing apparatus 10. The image-capturing apparatus 10 includes a control unit 110, the image-capturing element 120, an image-capturing element driving unit 200, an optical system 130, a lens driving unit 132, a lens driving unit 134, a lens driving unit 136, a storage unit 140, and a vibration detection unit 150.

The optical system 130 includes a zoom lens 131, a focus lens 133, and an image shake correcting lens 135. The focus lens 133 and the image shake correcting lens 135 may be formed of at least one lens. That is, at least one lens may provide both functions of a focus control and an image shake correction. The image-capturing apparatus 10 includes an Optical Image Stabilizer (OIS) and an In-Body Image Stabilizer (BIS). The image-capturing apparatus 10 may include at least either of the Optical Image Stabilizer (OIS) and the In-Body Image Stabilizer (BIS). The OIS performs an image shake correction by moving or rotating the image shake correcting lens 135. The BIS performs an image shake correction by moving or rotating the image-capturing element 120. If the image-capturing apparatus 10 includes both the OIS and the BIS, an image shake correction may be performed such that vibrations of different frequency bands are suppressed with each of the OIS and the BIS.

The image-capturing element 120 may be formed of a CCD or CMOS. The image-capturing element 120 outputs, to the control unit 110, a picture image data of an optical image that is imaged via the zoom lens 131, the focus lens 133, and the image shake correcting lens 135.

The control unit 110 may be formed of a microprocessor such as a CPU or an MPU, a microcontroller such as an MCU, or the like. The control unit 110 may be formed of a system-on-chip (SoC). The storage unit 140 may be a computer readable recording medium, and it may include at least one of SRAM, DRAM, EPROM, EEPROM (registered trademark) and a flash memory such as a USB memory. The storage unit 140 stores therein a program or the like necessary for allowing the control unit 110 to control the image-capturing element 120, the optical system 130, and the like. The storage unit 140 may be provided inside a housing of the image-capturing apparatus 10. The storage unit 140 may be provided in a manner that is removable from the housing of the image-capturing apparatus 10.

The zoom lens 131, the focus lens 133, and the image shake correcting lens 135 may include at least one lens. At least a part or all of the zoom lens 131 and the focus lens 133 are movably arranged along an optical axis.

The lens driving unit 132 moves the zoom lens 131 along the optical axis according to a zoom control instruction. The lens driving unit 134 moves the focus lens 133 along the optical axis according to a focus control instruction. The lens driving unit 136 moves the image shake correcting lens 135 in a plane (XY plane) intersecting with the optical axis according to an image shake correction instruction. The lens driving unit 136 may rotate the image shake correcting lens 135 on axes (the X axis and the Y axis) along the plane intersecting with the optical axis according to the image shake correction instruction. The lens driving unit 132, the lens driving unit 134, and the lens driving unit 136 may include an electromagnetic actuator, i.e., a voice coil motor, as a driving source. The lens driving unit 132, the lens driving unit 134, and the lens driving unit 136 may include a shape memory alloy (SMA) actuator or piezo (piezoelectric) actuator as a driving source. The lens driving unit 132 and the lens driving unit 134 may include a stepping motor as a driving source.

The vibration detection unit 150 outputs a vibration signal indicating a vibration of the image-capturing apparatus 10. The vibration detection unit 150 may include a gyro sensor detecting an angular velocity of the image-capturing apparatus 10. The gyro sensor detects each of angular velocities having the axes along the X axis, the Y axis, and the Z axis as the centers. The vibration detection unit 150 may include an acceleration sensor for detecting an acceleration of the image-capturing apparatus 10. The vibration detection unit 150 may include an inertial measurement unit (IMU) for detecting angular velocities of the image-capturing apparatus 10 having the axes along the X axis, the Y axis, and the Z axis as the centers, and an acceleration of the image-capturing apparatus 10 in the X axis, Y axis, and Z-axis directions of the image-capturing apparatus 10.

The image-capturing element driving unit 200 moves the image-capturing element 120 in the plane intersecting with the optical axis according to the image shake correction instruction. In addition, the image-capturing element driving unit 200 rotates the image-capturing element 120 on an axis along the optical axis according to the image shake correction instruction. The image-capturing element driving unit 200 may move and rotate the image-capturing element 120 with three degrees of freedom. The image-capturing element driving unit 200 may move the image-capturing element 120 along the XY plane, and rotate the image-capturing element 120 on the axis along the Z axis.

The control unit 110 controls the entire image-capturing apparatus 10. The control unit 110 controls the lens driving unit 132, the lens driving unit 134, the lens driving unit 136, and the image-capturing element driving unit 200.

Figure 8:
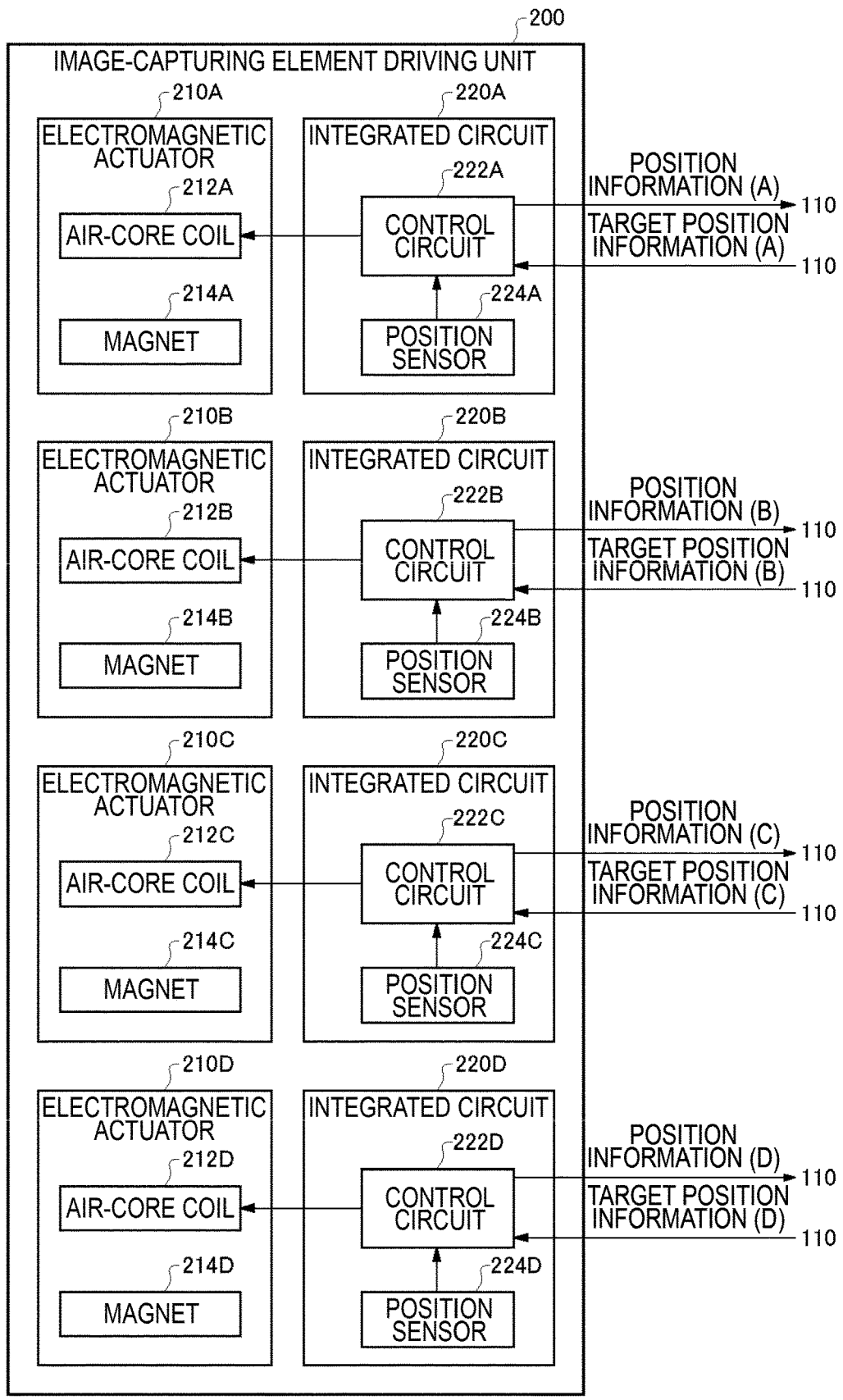
FIG. 8 shows an example of a circuit configuration of an image-capturing element driving unit.

FIG. 8 shows an example of a circuit configuration of the image-capturing element driving unit 200. The image-capturing element driving unit 200 includes the electromagnetic actuators 210A, 210B, 210C, 210D, and integrated circuits 220A, 220B, 220C, 220D.

The electromagnetic actuators 210A, 210B, 210C, 210D include air-core coils 212A, 212B, 212C, 212D (hereinafter, may be collectively referred to as the air-core coils 212) and magnets 214A, 214B, 214C, 214D (hereinafter, may be collectively referred to as the magnets 214). The air-core coils 212 may be provided for the substrate 122 equipped with the image-capturing element 120. The magnets 214 may be arranged in a holding member for holding the substrate 122 in a manner movable along an imaging area of the image-capturing element 120 and rotatable on the axis along the optical axis. The holding member may be, for example, the housing of the image-capturing apparatus 10. The substrate 122 may be movably and rotatably supported by the housing of the image-capturing apparatus 10 via an elastic body such as a spring. The magnets 214 may be fixed on an inner surface-side of the housing. It should be noted that the magnets 214 may be provided for the substrate 122, and the air-core coils 212 may be provided for the holding member such as the inner surface-side of the housing.

The integrated circuit 220 includes a control circuit 222 and the position sensor 224. The control circuit 222 is a driver IC for controlling a driving of the electromagnetic actuators 210. The position sensors 224 detect positions of the position sensors 224 relative to the magnets 214. The position sensors 224 may be magnetic sensors that detect positions of the position sensors 224 relative to the magnets 214 from a variation in a magnitude of a magnetic field caused by a variation in a positional relation between the magnets 214 and the position sensors 224. The magnetic sensors may be Hall elements. The control circuit 222 and the position sensor 224 may be integrated to form the integrated circuit 220.

The control unit 110 controls the integrated circuit 220. As shown in FIG. 7, the control unit 110 includes a position information acquisition unit 111, a target posture information acquisition unit 112, a correction information derivation unit 113, a target position derivation unit 114, and an output unit 115.

The position information acquisition unit 111 acquires from each position sensor 224, respective position information (A), position information (B), position information (C), and position information (D) indicating each position of each reference point of the substrate 122. The position information may be an information indicating a magnitude of a magnetic field detected with the position sensors 224.

The target posture information acquisition unit 112 acquires a target posture information indicating a target posture of the substrate 122. When moving or rotating the image-capturing element 120 or the image shake correcting lens 135 as a movable member to correct an image shake, the target posture information is derived from a vibration signal detected with the vibration detection unit 150. The target posture information acquisition unit 112 may acquire the target posture information of the substrate 122 indicating the target posture of the substrate 122 for moving and rotating the substrate 122 and the image-capturing element 120 in a direction canceling a vibration of the image-capturing apparatus 10 identified based on a detection result of the vibration detection unit 150. The target posture information indicates a target posture (X, Y, θ) including XY coordinate values of main reference points in the coordinate system and a rotation amount from a reference posture of the substrate 122. The target posture (X, Y, θ) includes an X component, a Y component, and a θ component associated with a movement or rotation of the substrate 122. It should be noted that, when moving the focus lens 133 as a movable member to perform a focus control, the target posture information may indicate the target position in an optical axis-direction of the focus lens 133 to achieve a focusing state specified by the focus control instruction. In addition, when moving the zoom lens 131 as a movable member to perform a zoom control, the target posture information may indicate the target position in an optical axis-direction of the zoom lens 131 to achieve a target zoom magnification specified by the zoom control instruction.

The correction information derivation unit 113 derives a correction information indicating a corrective component for correcting an error in respective target positions of four reference points of the substrate 122 due to another one degree of freedom component other than the X component, the Y component, and the A component which are the three degrees of freedom components associated with a movement or rotation of the substrate 122, according to a predefined algorithm having four values corresponding to the positions of the four reference points of the substrate 122 indicated in the respective position informations (A), (B), (C), (D) as variables. The predefined algorithm may be defined with, for example, a numerical formula of a 4×4 matrix. The correction information derivation unit 113 may derive a correction information according to each value x1, x2, y1, y2 corresponding to the position of each reference point of the substrate 122 and the numerical formula of the 4×4 matrix shown in the formula (3).

The target position derivation unit 114 derives respective target positions $x1_T$, $x2_T$, $y1_T$, $y2_T$ of the four reference points of the substrate 122 based on the three degrees of freedom X component, Y component, and A component indicated in the target posture information and the corrective component R for the another one degree of freedom indicated in the correction information. The target position derivation unit 114 derives respective target positions $x1_T$, $x2_T$, $y1_T$, $y2_T$ of the four reference points of the substrate 122 according to the predefined algorithm, based on the three degrees of freedom X component, Y component, and A component indicated in the target posture information and the corrective component R for the another one degree of freedom indicated in the correction information. The target position derivation unit 114 may derive the target positions $x1_T$, $x2_T$, $y1_T$, $y2_T$ according to the formula (2) which is a numerical formula of a 4×4 matrix, based on the three degrees of freedom X component, Y component, and A component indicated in the target posture information and the corrective component R for the another one degree of freedom indicated in the correction information.

The output unit 115 outputs the target position informations (A), (B), (C), (D) indicating the respective target positions $x1_T$, $x2_T$, $Y1_T$, $y2_T$ to respective control circuits 222A, 222B, 222C, 222D.

The control circuit 222 controls the electromagnetic actuators 210 according to the target position information. The control circuit 222 controls the electromagnetic actuators 210 with a PID control according to the target position indicated in the target position information.

As described above, according to the present embodiment, each target position of each reference point of the substrate 122 can be derived in consideration of an excess degree of freedom that does not contribute to a movement or rotation of the substrate 122 which is a movable member. Accordingly, even when an error is included in the position of each reference point detected with each position sensor 224, it is possible to prevent an increase in electrical power consumption by each electromagnetic actuator 210 due to a failure of the substrate 122 becoming the target posture.

The above-described embodiment described an example in which the image-capturing element 120 is moved and rotated with three degrees of freedom by separately controlling the four electromagnetic actuators 210. However, other embodiments may be used as long as the number of electromagnetic actuators 210 separately controlled is larger than the number of degrees of freedom contributing to a movement or rotation of the movable member.

That is, the control unit 110 may control m+n control circuits 222 for separately controlling each of m+n electromagnetic actuators 210 which move or rotate a movable member with m degrees of freedom. m and n are positive integers.

The position information acquisition unit 111 may acquire respective position informations indicating each of m+n positions of the movable member from m+n position sensors 224 detecting each of m+n positions of the movable member. The target posture information acquisition unit 112 may acquire a target posture information indicating a target posture of the movable member with m degrees of freedom component associated with a movement or rotation of the movable member.

The correction information derivation unit 113 may derive a correction information indicating a corrective component for correcting an error in the respective target positions of m+n positions of the movable member due to at least one of n degrees of freedom components other than m degrees of freedom associated with a movement or rotation of the movable member, based on at least one value of m+n values corresponding to m+n positions of the movable member indicated in the respective position informations. The correction information derivation unit 113 may derive a correction information indicating a corrective component for correcting an error in the respective target positions of m+n positions of the movable member due to at least one of n degrees of freedom components other than m degrees of freedom associated with a movement or rotation of the movable member, according to a predefined algorithm having at least one of m+n values corresponding to m+n positions of the movable member indicated in the respective position informations as a variable. The correction information derivation unit 113 may derive a correction information indicating a corrective component for correcting an error in the respective target positions of m+n positions of the movable member due to n degrees of freedom other than m degrees of freedom associated with a movement or rotation of the movable member, according to a predefined (m+n)×(m+n) matrix having m+n values corresponding to m+n positions of the movable member indicated in the respective position informations as variables.

The target position derivation unit 114 may derive the respective target positions of m+n reference points of the movable member based on m degrees of freedom components indicated in the target posture information and the corrective component for n degrees of freedom indicated in the correction information. The target position derivation unit 114 may derive the respective target positions of m+n reference points of the movable member according to m degrees of freedom components indicated in the target posture information, the corrective component for n degrees of freedom indicated in the correction information, and the predefined (m+n)×(m+n) matrix. The output unit 115 may output the respective target position informations indicating the respective target positions to each of m+n control circuits 222 to allow the movable member to achieve the target posture. The correction information derivation unit 113 may derive the correction information without using the (m+n)×(m+n) matrix. For example, m degrees of freedom components associated with a movement or rotation of the movable member is derived according to a predefined m×(m+n) matrix, and m+n variables are obtained according to a predefined (m+n)×m matrix corresponding to an inverse transformation of the predefined m×(m+n) matrix. The correction information derivation unit 113 may derive the correction information by deriving a difference between those m+n variables and the positions detected with the original m+n position sensors 224.

An example in which the image-capturing element 120 is moved and rotated with two straight advance movement degrees of freedom and one rotational degree of freedom has been described above. However, the present technique may be adopted to a case where not the image-capturing element 120 but the optical system 130 is moved and rotated with one straight advance movement degree of freedom and two rotational degrees of freedom.

Figure 9:
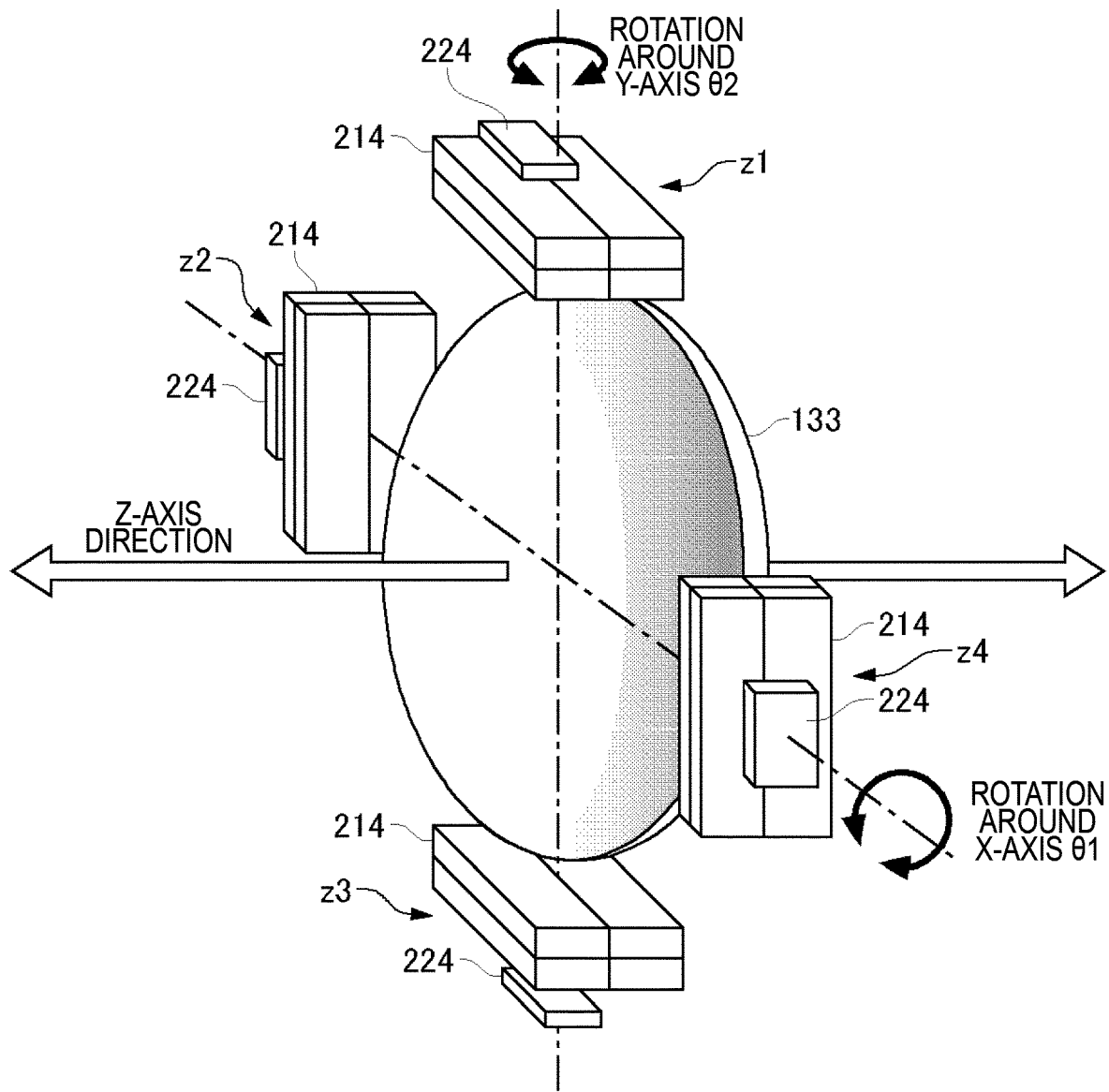
FIG. 9 illustrates a case where a focus lens is moved and rotated with one straight advance movement degree of freedom and two rotational degrees of freedom.

As shown in FIG. 9, the lens driving unit 136 may arrange the four magnets 214 in the holding frame which holds the focus lens 133 to move the focus lens 133 in the Z-axis direction and rotate the focus lens 133 around the X axis and around the Y axis. The lens driving unit 136 performs a focus control by moving the focus lens 133 along the Z-axis direction. Further, the lens driving unit 136 performs an image shake correction by rotating the focus lens 133 on an axis along the X axis or the Y axis. It should be noted that when an image shake correction is performed by using the focus lens 133, the image-capturing apparatus 10 may not include the image shake correcting lens 135.

Each value corresponding to the position of each reference point of the focus lens 133 detected with each position sensor 224 is denoted by $z1, z2, z3, z4$. The target posture includes a Z component contributing to a movement of the focus lens 133, a $\theta1$ component contributing to a rotation of the focus lens 133 around the X axis, and a $\theta2$ component contributing to a rotation of the focus lens 133 around the Y axis.

The correction information derivation unit 113 may derive, as the correction information, the corrective component R for one excess degree of freedom according to a numerical formula of a 4×4 matrix as shown in the following formula (4) and each value $z1, z2, z3, z4$ corresponding to the position of each reference point of the focus lens 133.

$$\begin{pmatrix} Z \\ \theta1 \\ \theta2 \\ R \end{pmatrix} = \frac{1}{4} \begin{pmatrix} 1 & 1 & 1 & 1 \\ 1 & 0 & -1 & 0 \\ 0 & 1 & 0 & -1 \\ 1 & -1 & 1 & -1 \end{pmatrix} \begin{pmatrix} z1 \\ z2 \\ z3 \\ z4 \end{pmatrix} \quad (4)$$

The target position derivation unit 114 may derive respective target positions ($z1_T$, $z2_T$, $z3_T$, $z4_T$) of four reference points of the focus lens 133 according to the three degrees of freedom components (Z, θ1, θ2) indicated in the target posture information, the corrective component R for one degree of freedom indicated in the correction information, and a numerical formula of a 4×4 matrix as shown in the following formula (5).

$$\begin{pmatrix} z1_T \\ z2_T \\ z3_T \\ z4_T \end{pmatrix} = \begin{pmatrix} 1 & 1 & 0 & 1 \\ 1 & 0 & 1 & -1 \\ 1 & -1 & 0 & 1 \\ 1 & 0 & -1 & -1 \end{pmatrix} \begin{pmatrix} Z \\ \theta1 \\ \theta2 \\ R \end{pmatrix} \quad (5)$$

Figure 10:
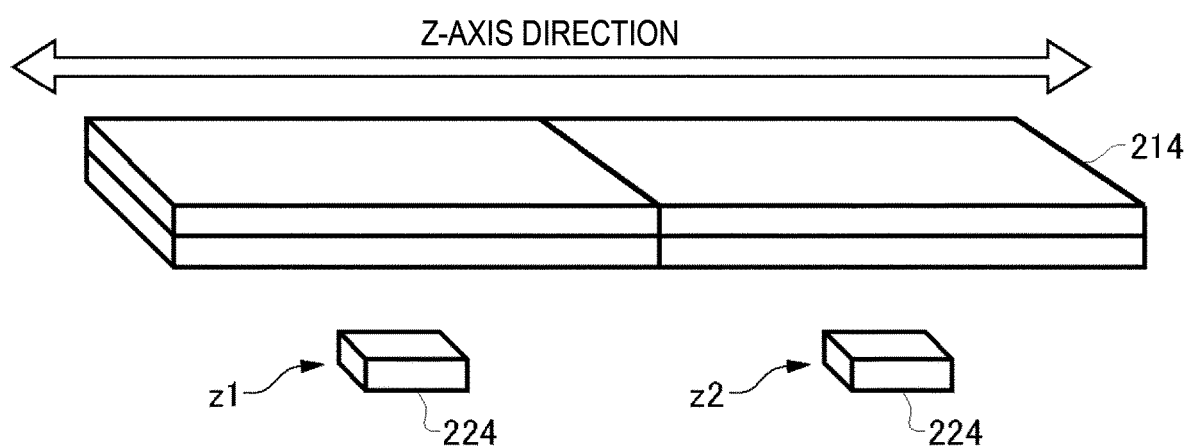
FIG. 10 illustrates a case where a zoom lens is moved with one straight advance movement degree of freedom.
Figure 11:
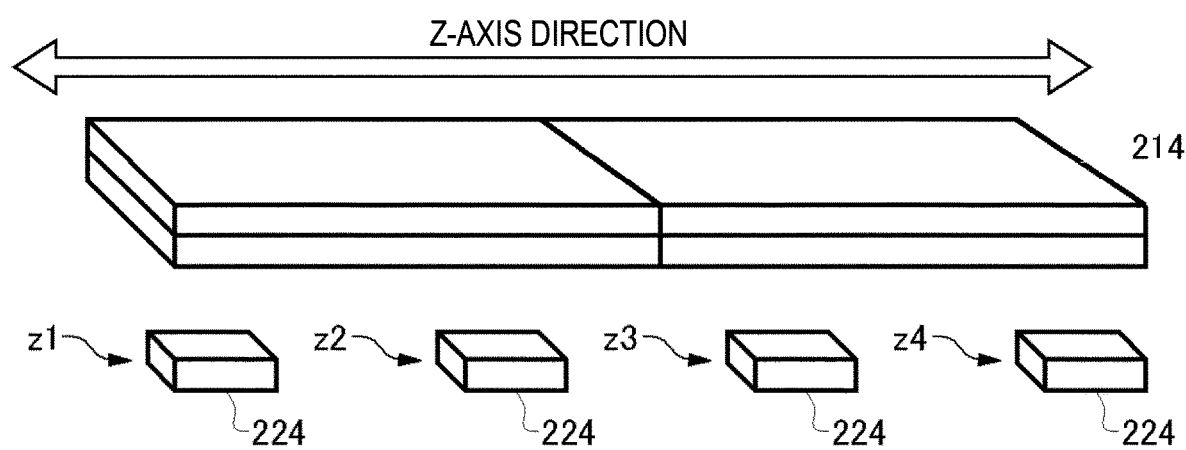
FIG. 11 illustrates the case where the zoom lens is moved with one straight advance movement degree of freedom.

As shown in FIG. 10 and FIG. 11, by supplying current to the air-core coils 212, the lens driving unit 132 may move the zoom lens 131 with one straight advance movement degree of freedom along the Z-axis direction together with the magnets 214 provided for the holding frame holding the zoom lens 131.

In the example of FIG. 10, two position sensors 224 detect each position of two reference points of the zoom lens 131 in the Z-axis direction. In this case, each value corresponding to the position of each reference point of the zoom lens 131 detected with each position sensor 224 is denoted by z1, z2. The target posture includes the Z component contributing to a movement of the zoom lens 131.

The correction information derivation unit 113 may derive, as the correction information, the corrective component R for one excess degree of freedom according to a numerical formula of a 2×2 matrix as shown in the following formula (6) and each value z1, z2 corresponding to the position of each reference point of the focus lens 133.

$$\begin{pmatrix} Z \\ R \end{pmatrix} = \frac{1}{2} \begin{pmatrix} 1 & 1 \\ 1 & -1 \end{pmatrix} \begin{pmatrix} z1 \\ z2 \end{pmatrix} \quad (6)$$

The target position derivation unit 114 may derive respective target positions ($z1_T$, $z2_T$) of the two reference points of the zoom lens 131 according to the one degree of freedom component Z indicated in the target posture information, the corrective component R for one degree of freedom indicated in the correction information, and a numerical formula of a 2×2 matrix as shown in the following formula (7).

$$\begin{pmatrix} z1_T \\ z2_T \end{pmatrix} = \begin{pmatrix} 1 & 1 \\ 1 & -1 \end{pmatrix} \begin{pmatrix} Z \\ R \end{pmatrix} \quad (7)$$

In the example of FIG. 11, four position sensors 224 detect respective positions of four reference points of the zoom lens 131 in the Z-axis direction. In this case, each value corresponding to the position of each reference point of the zoom lens 131 detected with each position sensor 224 is denoted by z1, z2, z3, z4. The target posture includes the Z component contributing to a movement of the zoom lens 131.

The correction information derivation unit 113 may derive, as the correction information, components R1, R2, R3 for three excess degrees of freedom according to a numerical formula of a 4×4 matrix as shown in the following formula (8) and each value z1, z2, z3, z4 corresponding to the position of each reference point of the zoom lens 131.

$$\begin{pmatrix} Z \\ R1 \\ R2 \\ R3 \end{pmatrix} = \frac{1}{4} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} z1 \\ z2 \\ z3 \\ z4 \end{pmatrix} \quad (8)$$

The target position derivation unit 114 may derive respective target positions ($z1_T$, $z2_T$, $z3_T$, $z4_T$) of the four reference points of the zoom lens 131 according to the one degree of freedom component Z indicated in the target posture information, the corrective components R1, R2, R3 for three degrees of freedom indicated in the correction information, and a numerical formula of a 4×4 matrix as shown in the following formula (9).

$$\begin{pmatrix} z1_T \\ z2_T \\ z3_T \\ z4_T \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Z \\ R1 \\ R2 \\ R3 \end{pmatrix} \quad (9)$$

An example in which the correction information derivation unit 113 derives respective corrective components for n degrees of freedom has been described above. As another example, the correction information derivation unit 113 may derive the corrective component based on m degrees of freedom components derived from m+n values corresponding to m+n positions of the movable member indicated in the respective position informations. The target position derivation unit 114 may derive the respective target positions of the m+n positions of the movable member based on the m degrees of freedom components indicated in the target posture information and the m+n corrective components indicated in the correction information.

For example, in the example shown in FIG. 11, the correction information derivation unit 113 derives one degree of freedom component $z_o$ according to the following formula (10) by using four values z1, z2, z3, z4 corresponding to the position of each reference point of the zoom lens 131 as variables. In the example shown in FIG. 11, the following formula (10) is derived from a dependency (z1+z2+z3+z4) of the values z1, z2, z3, z4 detected with each position sensor 224 of the first component (Z) on the left side of the above-described formula (8). Since this dependency is the total sum of the values z1, z2, z3, z4, $z_o$ may be referred to as the corrective component of the total sum.

$$z_o = \tfrac{1}{4}(z1+z2+z3+z4) \quad (10)$$

The correction information derivation unit 113 derives corrective components Δz1, Δz2, Δz3, Δz4 regarding one degree of freedom component indicated in the target posture information by deriving a difference between each respective value z1, z2, z3, z4 corresponding to the position of each reference point of the zoom lens 131 and one degree of freedom component $z_o$, i.e., the total sum corrective component $z_o$, according to the following formula (11).

$$\Delta z1 = z1 - z_o, \Delta z2 = z2 - z_o,$$
$$\Delta z3 = z3 - z_o, \Delta z4 = z4 - z_o \quad (11)$$

The target position derivation unit 114 may derive the respective target positions ($z1_T$, $z2_T$, $z3_T$, $z4_T$) of the four reference points of the zoom lens 131 by the following formula (12) according to the one degree of freedom component Z indicated in the target posture information and the four corrective components $\Delta z1$, $\Delta z2$, $\Delta z3$, $\Delta z4$.

$$\begin{pmatrix} z1_T \\ z2_T \\ z3_T \\ z4_T \end{pmatrix} = \begin{pmatrix} 1 & \Delta z1 \\ 1 & \Delta z2 \\ 1 & \Delta z3 \\ 1 & \Delta z4 \end{pmatrix} \begin{pmatrix} Z \\ 1 \end{pmatrix} \quad (12)$$

As described above, according to the present embodiment, each target position of each reference point of the substrate 122 can be derived in consideration of an excess degree of freedom not contributing to a movement or rotation of the substrate 122 which is the movable member. Accordingly, even when an error is included in the position of each reference point detected with each position sensor 224, it is possible to prevent an increase in electrical power consumption by each electromagnetic actuator 210 due to a failure of the substrate 122 becoming the target posture.

Figure 12:
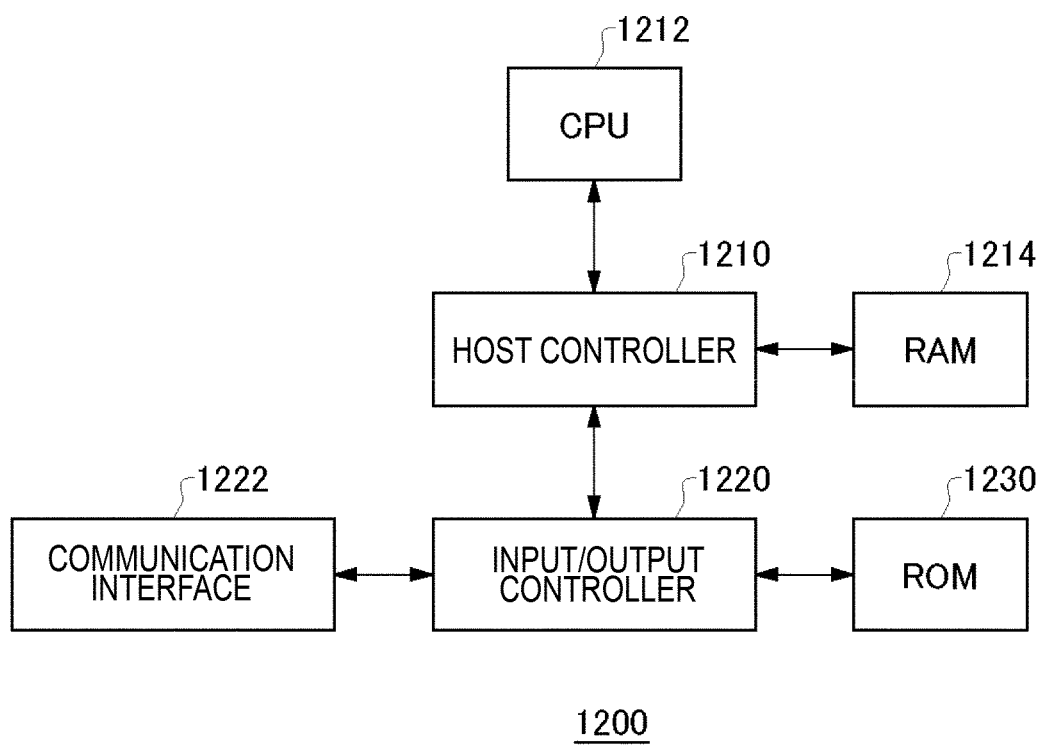
FIG. 12 shows an example of a hardware configuration.

FIG. 12 shows an example of a computer 1200 where a plurality of aspects of the present invention may be entirely or partially embodied. Programs installed in the computer 1200 can cause the computer 1200 to function as operations associated with the device according to the embodiments of the present invention or one or more "units" of the device. Alternatively, the programs can cause the computer 1200 to execute the operations or the one or more "units". The programs can cause the computer 1200 to execute a process according to the embodiments of the present invention or steps of the process. Such programs may be executed by a CPU 1212 to cause the computer 1200 to perform specific operations associated with some or all of the blocks in the flowcharts and block diagrams described in the present specification.

The computer 1200 according to the present embodiment includes the CPU1212 and an RAM 1214, which are mutually connected by a host controller 1210. The computer 1200 also includes a communication interface 1222 and an input/output unit, which are connected to the host controller 1210 via an input/output controller 1220. The computer 1200 also includes an ROM 1230. The CPU 1212 operates according to the programs stored in the ROM 1230 and the RAM 1214, thereby controlling each unit.

The communication interface 1222 communicates with other electronic devices via a network. A hard disk drive may store the programs and data used by the CPU 1212 in the computer 1200. The ROM 1230 stores therein boot programs or the like executed by the computer 1200 at the time of activation, and/or programs depending on hardware of the computer 1200. The programs are provided via a computer readable recording medium such as a CR-ROM, a USB memory, or an IC card, or a network. The programs are installed in the RAM 1214 or the ROM 1230 which is also an example of the computer readable recording medium, and executed by the CPU 1212. Information processing written in these programs is read by the computer 1200, and provides cooperation between the programs and the various types of hardware resources described above. The device or method may be configured by implementing operations or processings of information according to use of the computer 1200.

For example, in a case where communication is performed between the computer 1200 and an external device, the CPU 1212 may execute a communication program loaded in the RAM 1214 and instruct the communication interface 1222 to perform communication processing based on a processing written in the communication program. The communication interface 1222, under the control of the CPU 1212, reads transmission data stored in a transmission buffer region provided in a recording medium such as the RAM 1214 or the USB memory, transmits the read transmission data to the network, or writes reception data received from the network to a reception buffer region or the like provided on the recording medium.

In addition, the CPU 1212 may cause all or necessary portions of a file or database stored in an external recording medium such as a USB memory, to be read by the RAM 1214, and execute various types of processings on the data on the RAM 1214. Then, the CPU 1212 may write the processed data back in the external recording medium.

Various types of information such as various types of programs, data, tables, and databases may be stored in a recording medium and subjected to information processing. The CPU 1212 may execute, on the data read from the RAM 1214, various types of processings including various types of operations, information processing, conditional judgement, conditional branching, unconditional branching, information retrieval/replacement, or the like described throughout the present disclosure and specified by instruction sequences of the programs, and writes the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may retrieve, out of the plurality of entries, an entry with the attribute value of the first attribute specified that meets a condition, read the attribute value of the second attribute stored in said entry, and thereby acquiring the attribute value of the second attribute associated with the first attribute satisfying a predefined condition.

The programs or software modules described above may be stored in a computer readable storage medium on or near the computer 1200. In addition, a recording medium such as a hard disk or an RAM provided in a server system connected to a dedicated communication network or the Internet can be used as a computer readable storage medium, thereby providing a program to the computer 1200 via the network.

The computer readable medium may include any tangible device that can store instructions for execution by a suitable device. As a result, the computer readable medium having instructions stored therein includes an article of manufacture including instructions which can be executed to create means for performing operations specified in the flowcharts or block diagrams. Examples of the computer readable medium may include an electronic storage medium, a magnetic storage medium, an optical storage medium, an electromagnetic storage medium, a semiconductor storage medium, and the like. More specific examples of the computer readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

Computer-readable instructions may include either a source code or an object code written in any combination of one or more programming languages. The source code or the object code includes a conventional procedural programming language. The conventional procedural programming language may be assembler instructions, instruction-set-architecture (ISA) instructions, machine instructions, machine dependent instructions, microcode, firmware instructions, state-setting data, or an object-oriented programming language such as Smalltalk (registered trademark), JAVA (registered trademark), C++, etc., and programming languages, such as the "C" programming language or similar programming languages. Computer-readable instructions may be provided to a processor of a general-purpose computer, special purpose computer, or other programmable data processing device, or to programmable circuitry, locally or via a local area network (LAN), a wide area network (WAN) such as the Internet, etc. The processor or the programmable circuitry may execute the computer readable instructions to create means for performing operations specified in the flowcharts or block diagrams. Examples of the processor include a computer processor, a processing unit, a microprocessor, a digital signal processor, a controller, a microcontroller, and the like.

While the embodiments of the present invention have been described, the technical scope of the present invention is not limited to the scope described in the embodiments described above. It is apparent to persons skilled in the art that various alterations or improvements can be added to the embodiments described above. It is also apparent from the descriptions of the scope of the claims that the embodiments added with such alterations or improvements can also be included in the technical scope of the present invention.

It should be noted that each processing such as operations, procedures, steps, and stages in a device, a system, a program, and a method shown in the claims, the specification, and the drawings may be performed in any order as long as the order is not particularly indicated by "prior to," "before," or the like and as long as the output from a previous processing is not used in a later processing. Even if the operation flow is described using phrases such as "first" or "then" for convenience in the claims, the specification, and the drawings, it does not necessarily mean that the processing must be performed in this order.

EXPLANATION OF REFERENCE NUMERALS 10 image-capturing apparatus
20 object
110 control unit
111 position information acquisition unit
112 target posture information acquisition unit
113 correction information derivation unit
114 target position derivation unit
115 output unit
120 image-capturing element
122 substrate
130 optical system
131 zoom lens
133 focus lens
135 image shake correcting lens
132, 134, 136 lens driving unit
140 storage unit
150 vibration detection unit
200 image-capturing element driving unit
210A, 210B, 210C, 210D electromagnetic actuator
212A, 212B, 212C, 212D air-core coil
214A, 214B, 214C, 214D magnet
220A, 220B, 220C, 220D integrated circuit
222A, 222B, 222C, 222D control circuit
224A, 224B, 224C, 224D position sensor
1200 computer
1210 host controller
1212 CPU
1214 RAM
1220 input/output controller
1222 communication interface
1230 ROM

What is claimed is:

1. A control method of controlling m+n control circuits separately controlling each of m+n (m and n are positive integers) actuators moving or rotating a movable member with m degrees of freedom, the control method comprising:
acquiring respective position informations indicating each of m+n positions of the movable member from a detection unit detecting each of m+n positions of the movable member;
acquiring a target posture information indicating a target posture of the movable member with m degrees of freedom components associated with a movement or rotation of the movable member;
deriving a correction information indicating a corrective component for correcting an error in respective target positions of m+n positions of the movable member due to at least one of n degrees of freedom components other than m degrees of freedom associated with a movement or rotation of the movable member, based on at least one value of m+n values corresponding to m+n positions of the movable member indicated in the respective position informations;
deriving respective target positions of m+n positions of the movable member based on m degrees of freedom components indicated in the target posture information and the corrective component indicated in the correction information; and
outputting respective target position informations indicating the respective target positions to each of the m+n control circuits to achieve a target posture of the movable member.

2. The control method according to claim 1, wherein the corrective component comprises a corrective component regarding each of n degrees of freedom components.

3. The control method according to claim 2, wherein the deriving the correction information comprises deriving the correction information according to an algorithm defined with a (m+n)×(m+n) matrix by using m+n values corresponding to m+n positions of the movable member indicated in the respective position informations as variables.

4. The control method according to claim 2, wherein the deriving the correction information comprises deriving the correction information by: deriving m degrees of freedom components associated with a movement or rotation of the movable member according to a predefined m×(m+n) matrix by using the m+n values corresponding to m+n positions of the movable member indicated in the respective position informations as variables; deriving m+n variables according to a predefined (m+n)×m matrix corresponding to an inverse transformation of the predefined m×(m+n) matrix; and deriving a difference between the m+n values corresponding to m+n positions of the movable member indicated in the respective position informations and the m+n variables.

5. The control method according to claim 1, wherein the corrective component comprises a corrective component regarding a total sum of n degrees of freedom components.

6. The control method according to claim 1, wherein:
the detection unit comprises m+n position sensors; and
each of the m+n control circuits and each of the m+n position sensors are integrated to form m+n integrated circuits.

7. The control method according to claim 6, wherein:
each of the m+n actuators is an electromagnetic actuator; and
each of the m+n position sensors is a magnetic sensor.

8. The control method according to claim 1, wherein each of the m+n control circuits is for separately controlling each of m+n actuators by a PID control based on the respective target positions.

9. The control method according to claim 1, wherein:
m is 3 and n is 1; and
by driving of the m+n actuators, the movable member moves along a first direction and a second direction and rotates on a first rotational axis intersecting with a plane along the first direction and the second direction.

10. The control method according to claim 1, wherein:
m is 3 and n is 1; and
by driving of the m+n actuators, the movable member moves along a first direction and rotates on each of a first rotational axis and a second rotational axis along a plane intersecting with the first direction.

11. The control method according to claim 1, wherein:
m is 1 and n is an integer of 1 or higher; and
by driving of the m+n actuators, the movable member moves along a first direction.

12. A control device for controlling m+n control circuits separately controlling each of m+n (m and n are positive integers) actuators moving or rotating a movable member with m degrees of freedom, the control device comprising:
a position information acquisition unit for acquiring respective position informations indicating each of m+n positions of the movable member from a detection unit detecting each of m+n positions of the movable member;
a target posture information acquisition unit for acquiring a target posture information indicating a target posture of the movable member with m degrees of freedom components associated with a movement or rotation of the movable member;
a correction information derivation unit for deriving a correction information indicating a corrective component for correcting an error in respective target positions of m+n positions of the movable member due to at least one of n degrees of freedom components other than m degrees of freedom associated with a movement or rotation of the movable member, based on at least one value of m+n values corresponding to m+n positions of the movable member indicated in the respective position informations;
a target position derivation unit for deriving respective target positions of m+n positions of the movable member based on m degrees of freedom components indicated in the target posture information and the corrective component indicated in the correction information; and
an output unit for outputting respective target position informations indicating the respective target positions to each of the m+n control circuits to achieve a target posture of the movable member.

13. An image-capturing apparatus comprising:
the control device according to claim 12;
an image-capturing element;
an optical system for imaging an object on an imaging area of the image-capturing element;
the m+n actuators; and
a detection unit for detecting each of m+n positions of the movable member, wherein
the movable member is the image-capturing element or the optical system.

14. The image-capturing apparatus according to claim 13, wherein:
the detection unit comprises m+n position sensors;
each of the m+n actuators is an electromagnetic actuator; and
each of the m+n position sensors is a magnetic sensor.

15. The image-capturing apparatus according to claim 14, wherein each of the m+n control circuits and each of the m+n position sensors are integrated to form m+n integrated circuits.

16. The image-capturing apparatus according to claim 13, wherein:
m is 3 and n is 1;
the movable member is the image-capturing element; and
by driving of the m+n actuators, the image-capturing element moves along a first direction and a second direction and rotates on a first rotational axis intersecting with a plane along the first direction and the second direction to perform an image shake correction.

17. The image-capturing apparatus according to claim 13, wherein:
m is 3 and n is 1;
the movable member is the optical system; and
by driving of the m+n actuators, the optical system moves along a first direction and rotates on each of a first rotational axis and a second rotational axis along a plane intersecting with the first direction to perform at least one of an image shake correction and a focus control.

18. The image-capturing apparatus according to claim 13, wherein:
m is 1 and n is an integer of 1 or higher;
the movable member is the optical system; and
by driving of the m+n actuators, the optical system moves along a first direction to perform a focus control or zoom control.

19. A non-transitory computer readable recording medium having stored therein a program for causing a computer to function as a control device for controlling m+n (m and n are positive integers) control circuits separately controlling each of m+n actuators moving or rotating a movable member with m degrees of freedom, wherein the program causes the computer to execute:
acquiring respective position informations indicating each of m+n positions of the movable member from a detection unit detecting each of m+n positions of the movable member;
acquiring a target posture information indicating a target posture of the movable member with m degrees of freedom components associated with a movement or rotation of the movable member;
deriving a correction information indicating a corrective component for correcting an error in respective target positions of m+n positions of the movable member due to at least one of n degrees of freedom components other than m degrees of freedom associated with a movement or rotation of the movable member, based on at least one value of m+n values corresponding to m+n positions of the movable member indicated in the respective position informations;

deriving respective target positions of m+n positions of the movable member based on m degrees of freedom components indicated in the target posture information and the corrective component indicated in the correction information; and outputting respective target position informations indicating the respective target positions to each of the m+n control circuits to achieve a target posture of the movable member.

\* \* \* \* \*